United States Patent [19]

Bertozzi et al.

[11] Patent Number: 5,273,770
[45] Date of Patent: Dec. 28, 1993

[54] METHOD FOR EXTRUDING PASTA

[75] Inventors: Fausto Bertozzi, Parma; Carmelo Motta, Milan, both of Italy

[73] Assignee: Barilla G.e.R. F.lli - Societa per Azioni, Parma, Italy

[21] Appl. No.: 857,511

[22] Filed: Mar. 25, 1992

[30] Foreign Application Priority Data

Mar. 26, 1991 [IT] Italy .................. MI91 A 000805

[51] Int. Cl.$^5$ .............................................. A21C 1/00
[52] U.S. Cl. ...................................... 426/496; 426/504; 426/516
[58] Field of Search ............... 426/496, 504, 516, 517, 426/519; 425/205, 206, 207, 209

[56] References Cited

U.S. PATENT DOCUMENTS 5,126,159  6/1992  Manser et al. ..................... 426/504

FOREIGN PATENT DOCUMENTS

| 367569 | 5/1929 | Belgium . |
| 407282 | 2/1935 | Belgium . |
| 574239 | 7/1924 | France . |
| 59-209634 | 11/1984 | Japan . |

*Primary Examiner*—George Yeung
*Attorney, Agent, or Firm*—Sughrue, Mion, Zinn, Macpeak & Seas

[57] ABSTRACT

In the method described, the dough to be extruded is kneaded in a plurality of successive stages and at pressures which increase from stage to stage, the dough being allowed to rest between one stage and the next at the pressure attained at the time.

2 Claims, 3 Drawing Sheets

METHOD FOR EXTRUDING PASTA

BACKGROUND OF THE INVENTION

The present invention relates in general to a method of producing pasta on an industrial scale.

The invention relates in particular to a method for the continuous extrusion through a die of a dough of semolina, water and possibly other ingredients, suitable for producing corresponding pasta products.

It is well known that, for extrusion through a die, the preselected dough must be compressed to fairly high pressures which, for the production of spaghetti and similar elongate types of pasta, for example, may reach 70–80 kg/cm$^2$.

It is also known that so-called screw feeders have been used universally up to now in order, on the one hand, to supply a die continuously with a dough which has been compressed to these values (extrusion pressures) and, on the other hand, to ensure acceptable productivity from an industrial point of view.

Essentially, a screw feeder comprises an internally-grooved cylinder in which a worm screw rotates to knead and transport the dough towards the die.

As it advances and is compressed in the screw feeder, the dough is subjected to considerable mechanical stress and at the same time is heated appreciably because of the resilient, viscous nature of the dough, the large amount of friction with the internally-grooved wall of the cylinder and the lesser, but still considerable, amount of friction with the screw.

As a result, the structure of the dough is inevitably degraded, resulting in a recognised and equally inevitable reduction in the organoleptic quality of the pasta products produced therefrom.

SUMMARY OF THE INVENTION

The present invention is based on the technical problem of providing a method of extruding dough through a die which can overcome all the problems mentioned with reference to the prior art and which at the same time can best meet the requirements for the industrial production of high-quality pasta.

According to the invention, this problem is solved by a method of extruding dough through a die, characterised in that it consists of:

kneading the dough in a plurality of successive separate stages at pressures which increase from stage to stage until an extrusion pressure is reached, allowing the dough to rest between one stage and the next whilst keeping it at the pressure reached at the time, and extruding the dough after a last rest at the extrusion pressure attained.

According to one characteristic of the method of the invention, the dough is kneaded by at least one pair of rolling drums during each of the successive separate stages.

The kneading of dough essentially by rolling avoids the risk of the mechanical stress and overheating which occurs when it is worked by a screw feeder.

In fact, it is recognised that rolling is the mechanical method of working dough which most resembles the manual method.

Moreover, the temperature of the dough during its kneading and simultaneous compression to the extrusion pressure can be controlled and regulated easily to values such that its structure is not endangered, by the control and regulation of the temperatures of the rolling drums.

The characteristics and advantages of the invention will become clearer from the following description of an embodiment of the extrusion method according to the invention, given by way of non-limiting example with reference to the appended drawings showing equipment for carrying out the method.

DETAILED DESCRIPTION OF THE INVENTION

Figure 1:
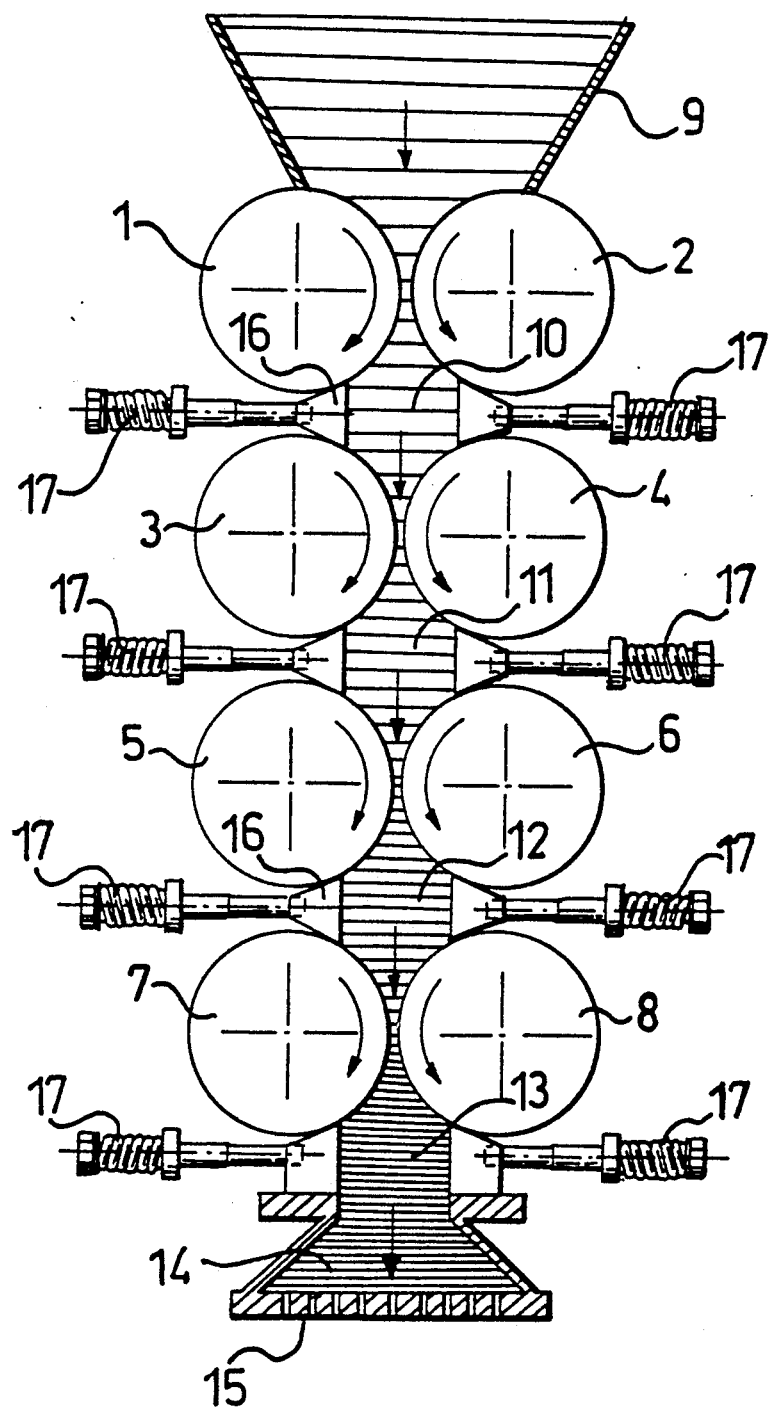
FIG. 1 shows schematically equipment for extruding dough according to the method of the invention.

With reference to FIG. 1, equipment for carrying out the extrusion method of the invention comprises a plurality of pairs of rolling drums, for example, four pairs of drums 1-2, 3-4, 5-6 and 7-8, which are conventionally motor-driven and are supported in conventional manner, with their axes horizontal, by a structure, not shown.

The pairs of drums are spaced apart and, by way of example, are disposed one above another in a generally vertical arrangement.

The first pair of drums 1-2 is surmounted by a hopper 9 for loading the dough.

A dough-compression chamber is defined between each pair of drums and the next. In the embodiment illustrated, the equipment of the invention thus includes four compression chambers 10, 11, 12 and 13.

The bottom compression chamber 13 is open to the diffuser or cone 14 of a plate-shaped die 15.

A plurality of scrapers, all indicated 16, are urged against the surfaces of the rolling drums, for example, by respective resilient means 17.

The method of the invention provides for the dough to be kneaded in a plurality of successive separate stages at pressures which increase from stage to stage until the extrusion pressure is reached. Moreover, the kneading is essentially a rolling action.

In the equipment shown schematically in FIG. 1, the successive kneading stages are carried out by the successive separate pairs of rolling drums 1-2, 3-4, 5-6 and 7-8, each pair of drums making its own contribution to the compression and kneading of the dough which has already been compressed and kneaded by the preceding pair of drums.

The method of the invention also provides for the kneaded and compressed dough to rest between one stage and the next at the pressure it has currently reached.

In the equipment of FIG. 1, the resting takes place in the individual compression chambers 10, 11, 12 and 13 between the pairs of rolling drums.

The dough which has been kneaded and compressed several times to reach the extrusion pressure is extruded from the bottom compression chamber 13 through the die 15.

If spaghetti is to be produced, the number and diameter of the holes in the die 15 are such that the extrusion can take place only when the pressure in the cone 14 and in the compression chamber 13 has reached, for example, a value of 80 kg/cm$^2$.

The diameters of the rolling drums of each pair, their spacing in the plane of rolling, that is to say, the gap between the drums of each pair, and their rates of rotation are selected so that each pair of drums contributes equally to the compression of the dough during the kneading. The pressures of the dough in the compression chambers 10 to 13 are thus 20, 40, 60 and 80 kg/cm², respectively.

The time for which the dough remains in the compression chamber depends on the dimensions of the chamber, particularly its length in the direction in which the dough moves. During this time, the dough rests, that is to say, it is not kneaded but is simply transferred from one pair of rolling drums to the next. It has been found that, when the compression chambers have volumes equal to or at least comparable with that of the cone 14, the time for which the dough rests in each chamber at the corresponding pressure is more than enough almost completely to cancel out the stress to which the structure of the dough has been subjected during the mechanical kneading carried out by the rolling drums. This is in complete contrast with what occurs in the screw feeders of the prior art, in which the stress accumulates from the start of compression to extrusion. It has consequently been found that, after kneading and compression in the equipment of the invention, the dough is kneaded very well and its structure is practically intact.

The equipment described above for carrying out the extrusion method of the invention may be varied and modified in many ways.

Figure 2:
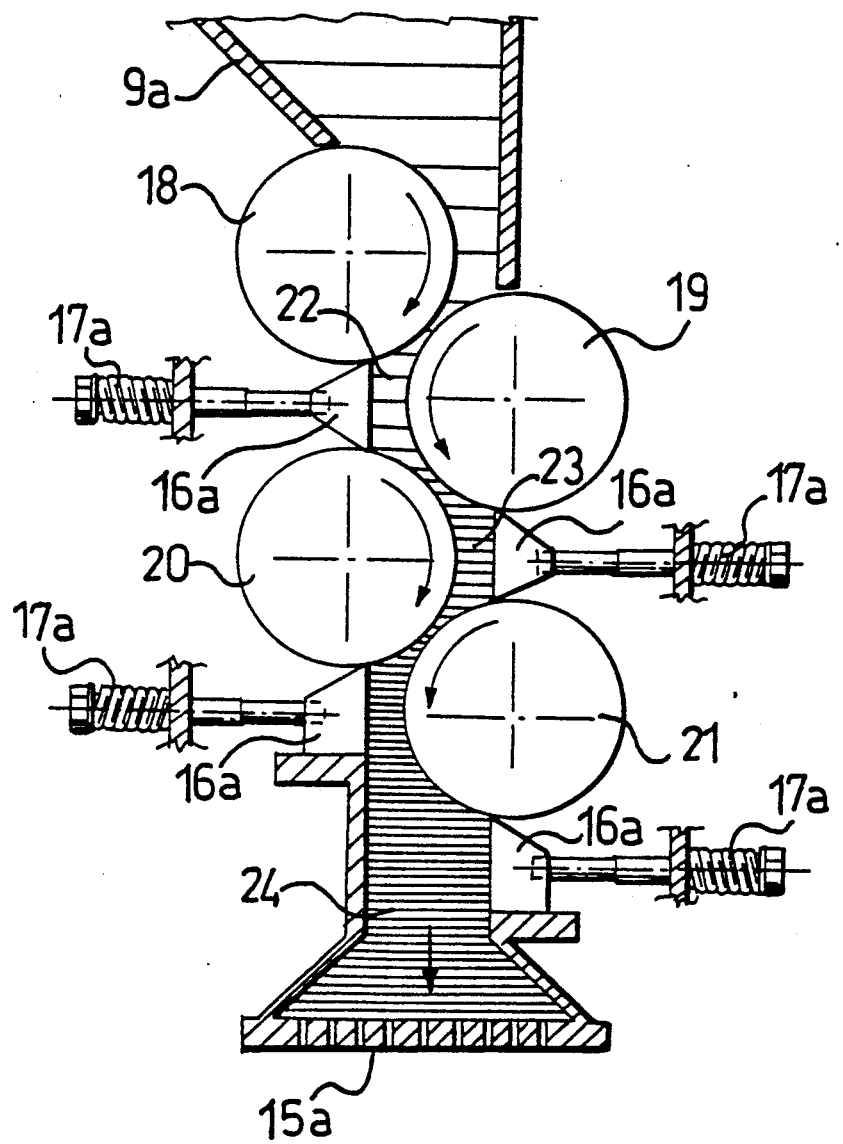
FIGS. 2 and 3 show schematically respective variants of the equipment of FIG. 1.

Thus, for example, the equipment of FIG. 2 includes four rolling drums 18, 19, 20 and 21 supported with their axes horizontal in a substantially quincuncial arrangement so as to form three successive working stages of the method of the invention. In this variant, the compression chambers 22, 23 and 24 are in a staggered arrangement. In particular, the lengths of the paths for the dough defined by the chambers 22 and 23 depend on the diameters of the drums and the time for which the compressed dough remains in the chamber or rests consequently also depends on that value. The length of the path for the dough defined by the chamber 24, however, is free of geometrical constraints and can thus be correlated solely with the desired time for which the dough is to remain therein.

This equipment also has a plurality of scrapers, all indicated 16a, operated by respective resilient means 17a, a load hopper 9a, and a plate-shaped die 15a.

Figure 3:
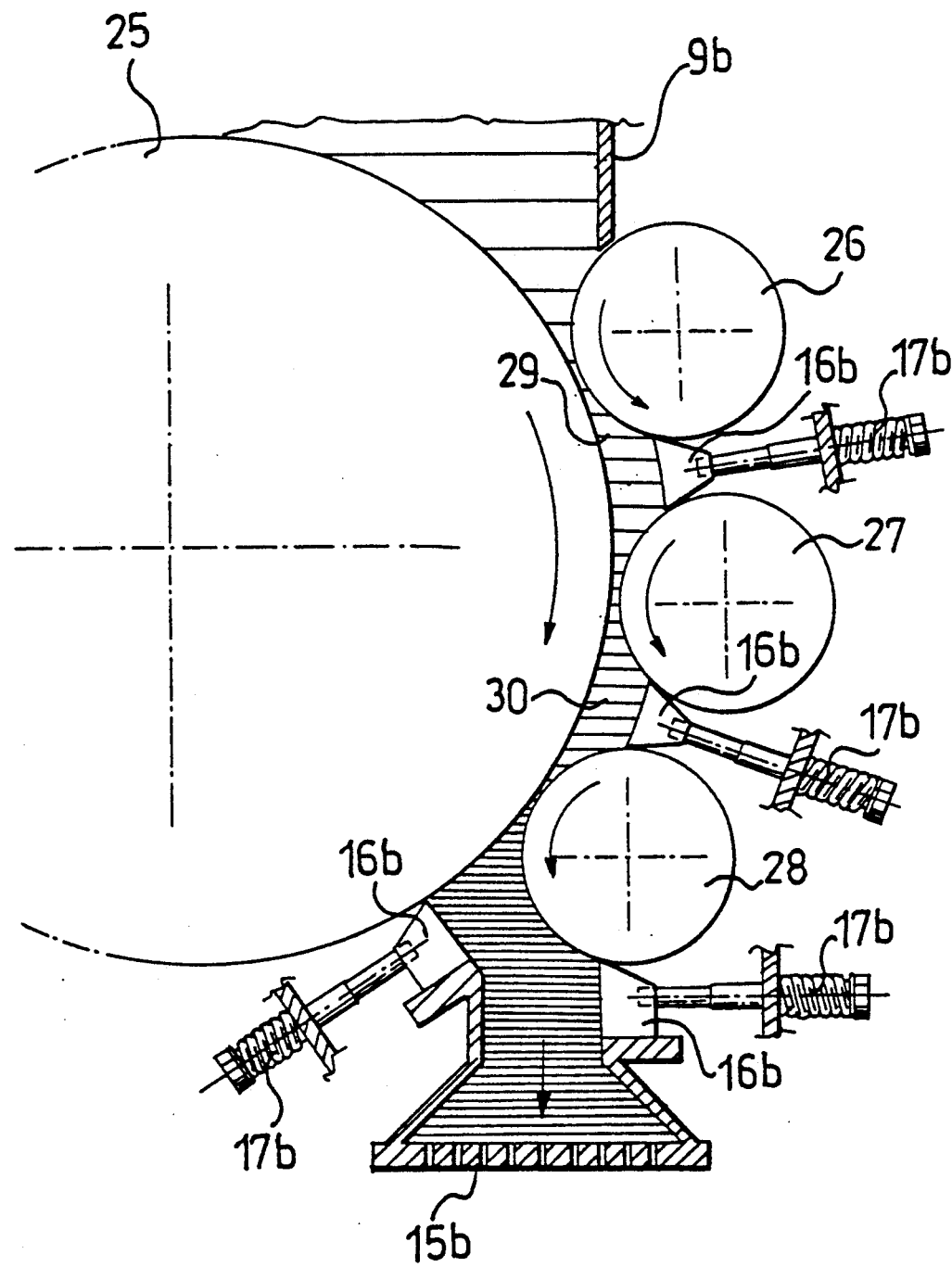

The equipment of FIG. 3 includes a large-diameter rolling drum 25 whose cylindrical surface cooperates with three rolling drums 26, 27 and 28 of equal diameter, constituting three successive working stages of the method of the invention. In this embodiment of the equipment of the invention, the compression chambers 29, 30 also define paths for the dough which are correlated with the diameters of the drums 26, 27 and 28, whilst the last compression chamber 31 defines a path for the dough which is not bound by geometrical constraints. A plurality of scrapers 16b operated by respective resilient means 17b, a load hopper 9b, and a plate-shaped die 15b complete the equipment of the invention shown schematically in FIG. 3.

What is claimed is:

1. A method of extruding dough through a die, characterised in that it consists of:
    kneading the dough in a plurality of successive separate stages at pressures which increase from stage to stage until an extrusion pressure is reached,
    allowing the dough to rest between each kneading stage at the same pressure reached by the previous kneading stage, and
    extruding the dough through the die after a last rest at the extrusion pressure attained.

2. A method according to claim 1, characterised in that the dough is kneaded by at least one pair of rolling drums during each of the successive, separate stages.

* * * * *